United States Patent [19]

Harper et al.

[11] 4,094,611
[45] June 13, 1978

[54] SECURING MEANS FOR MACHINE PARTS

[75] Inventors: John A. Harper, High Wycombe; Terence V. Williams, Marlow, both of England

[73] Assignee: Austin Hoy and Company, Ltd.

[21] Appl. No.: 781,353

[22] Filed: Mar. 25, 1977

[30] Foreign Application Priority Data

Jan. 28, 1977 United Kingdom ............... 3694/77

[51] Int. Cl.² ........................................... F16B 21/00
[52] U.S. Cl. ..................................... 403/14; 403/316; 403/379; 299/91
[58] Field of Search ............... 403/316, 317, 318, 379, 403/326, 14, 24; 299/89, 91

[56] References Cited

U.S. PATENT DOCUMENTS

| | | | |
|---|---|---|---|
| 1,106,934 | 8/1914 | Fischer | 403/379 |
| 2,399,581 | 4/1946 | Spooner | 85/5 B |
| 3,309,864 | 3/1967 | Arndt et al. | 403/316 |
| 3,966,257 | 6/1976 | Shah | 299/89 |

Primary Examiner—Andrew V. Kundrat

[57] ABSTRACT

Means are disclosed for securing together a first, U-shaped member and a second member received within the first member. In the preferred embodiment, the second member is a holder for a mineral cutter pick and the U-shaped member is formed on a drum or cutter chain of a mining machine. The means comprise registering bores in the legs of the U-shaped member and in the second member, one of the members being formed with a recess extending transversely from the bore therein. A hollow cross pin is received within the bores and a locking pin is driven through a transverse bore in the cross pin to extend into said recess. The cross pin has a length equal to or less than said bores in registration, and part of its internal surface is provided with a screw thread.

6 Claims, 4 Drawing Figures

SECURING MEANS FOR MACHINE PARTS

BACKGROUND OF THE INVENTION

The invention relates to a means for securing machine parts together.

One application of the invention lies in securing pick holders for mineral cutter picks within U-shaped members formed on cutter drums and the like of mineral mining machines. It has hitherto been known to accomplish this by passing a cross pin through registering bores in the sides of the U-shaped member and in pick holder received therebetween, the cross pin then being secured in position by means of locking pins driven as an interference fit through diametrical bores in the cross pin positioned such that the ends of the locking pins project from the cross pin adjacent the outer faces of the U-shaped member. However, this necessitates the ends of the cross pin and the locking pins extending from the U-shaped member, where they are subject to a high degree of wear by the scrubbing action of the mineral being cut.

SUMMARY OF THE PRESENT INVENTION

It is a general object of the present invention to provide an improved securing means suitable for use inter alia in securing a pick holder to a mineral mining machine.

A further object is to provide a connection which can be secured and disconnected from either side.

Another object is to avoid the entry of dirt into the securing means when in use.

The invention accordingly resides in means for securing together a first, U-shaped member and a second member received within the first member, comprising registering bores in the legs of the first member, a bore in the second member positionable in registration with and of equal cross section to the bores in the first member, at least one recess formed in one of said members to extend transversely from the bore therein, a cross pin having a cross section corresponding with said bores and being of a length equal to or less than the overall length of said bores in registration, the cross pin being hollow and provided on part of its internal surface with a screw thread, the cross pin also having a transverse bore extending from its internal to its external surface and adapted for positioning opposite said recess, and a locking pin drivable into the transverse bore to extend into the recess.

Preferably, the bores in the first and second members have a cross section comprising the major part of a circle joined by a straight chord.

Preferably also, the securing means includes a keeper member which may be engaged in the screw thread within the cross pin to substantially close the interior of the cross pin.

The locking pin is suitably a split roll pin which is an interference fit in the transverse bore.

The first member is preferably provided with two recesses, one in each leg thereof, whereby the cross pin may be inserted from either side.

The first member preferably forms a part of a mineral mining machine and the second member comprises a holder for a mineral cutter pick.

BRIEF DESCRIPTION OF THE DRAWINGS

The invention will be further described, by way of example, referring to the accompanying drawings, in which.

DETAILED DESCRIPTION OF THE EMBODIMENT

Figure 1:
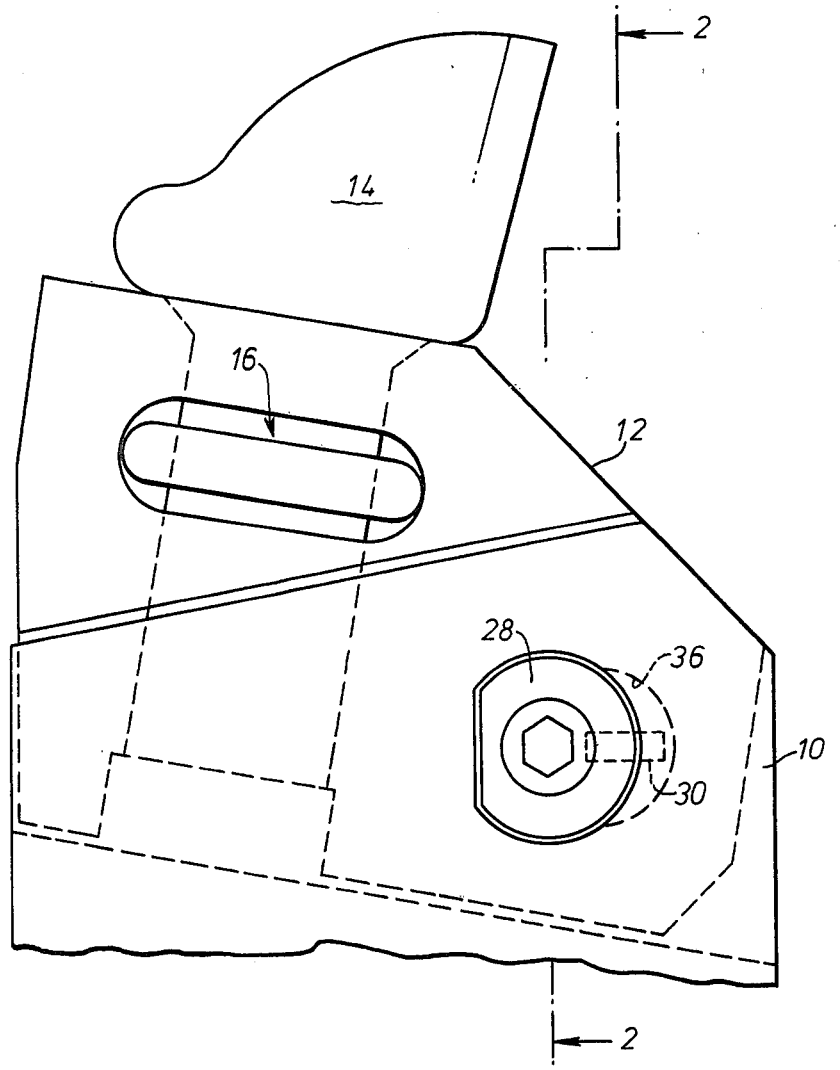
FIG. 1 is a side elevation of part of a mineral mining machine embodying the invention.
Figure 2:
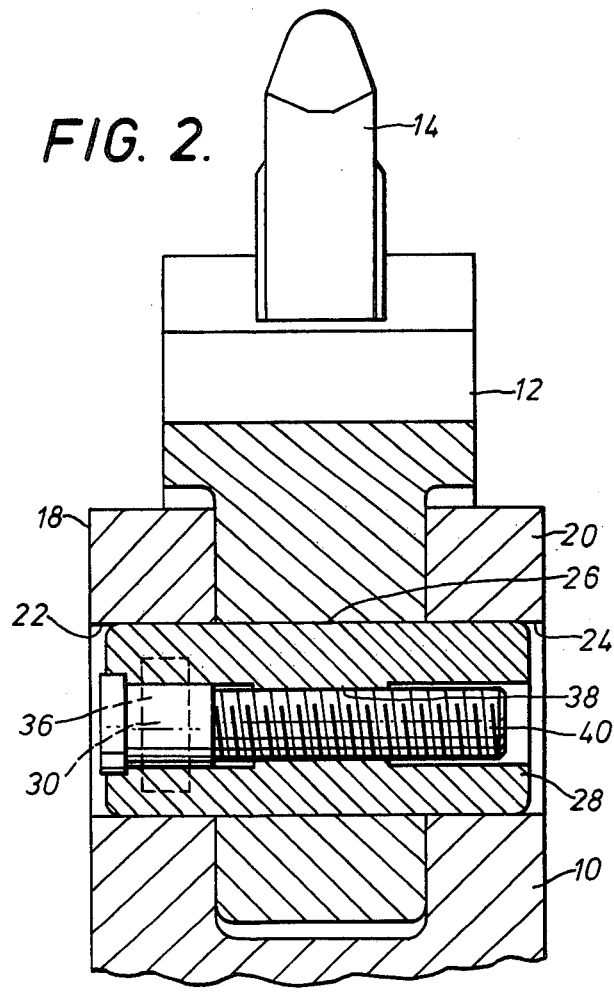
FIG. 2 is a cross section taken on the line 2—2 of FIG. 1.

The drum of a coal cutting machine has a number of U-shaped members such as the member 10 seen in FIGS. 1 and 2 formed on its periphery. A pick holder 12 is secured in the member 10 by means to be described. A cutter pick 14 is secured in the holder 12 by a latch generally designated at 16. The pick 14 and latch 16 may be of any convenient type and will not be further described.

Figures 3, 4:
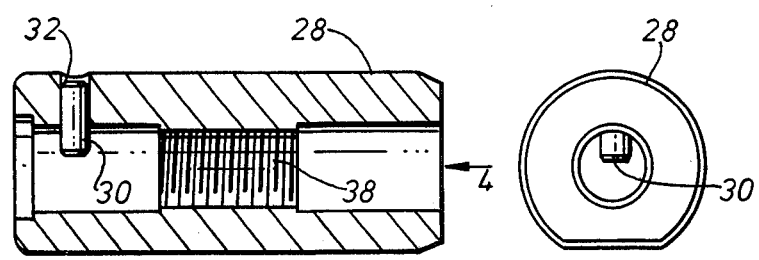
FIG. 3 is a cross section of one of the elements of FIGS. 1 and 2, the section being taken at right angles to that of FIG. 2.
FIG. 4 is an end view taken in the direction of the arrow 4 of FIG. 3.

The U-shaped member 10 includes legs 18 and 20 through which are formed aligned bores 22 and 24 respectively. A similar bore 26 is formed in the holder 12. The bores 22, 24 and 26 are of generally cylindrical form, but have a flattened surface at one side. A cross pin 28 of mating external shape (as seen in FIG. 4) is received in the aligned bores 22, 24, 26 and is secured in position by means of a locking pin 30 driven through a transverse bore 32 in the cross pin 28 to project into recess 36 extending from the bore 22 of the member 10. The cross pin 28 is hollow and has an internally screw-threaded portion 38 into which a keeper 40 is screwed to exclude dirt during operation of the cutter.

It will be appreciated that FIGS. 1 and 2 show the parts in the assembled state ready for use. FIG. 3 shows the cross pin 28 and locking pin 30 before assembly. To secure the pick holder 12 in the member 10, the holder 12 is positioned to align the bore 26 therein with the bores 22 and 24. The cross pin 28 with the locking pin 30 positioned as in FIG. 3 is then inserted through the aligned bores until the locking pin 30 is in alignment with the recess 36. The flattened faces ensure correct orientation of the cross pin 28 within the bores. The locking pin 30 is then driven into the recess 36 by driving a wedge-shaped tool through the interior of the cross pin 28 by hammer blows. The keeper 40 may then be inserted.

The locking pin 30 is suitably a split roll pin which is a tight fit in the transverse bore 32.

To remove the pick holder 12 from the member 10, the keeper 40 is first removed. A tool with a screw-threaded shank is then engaged with the screw-threaded portion 38. The tool is provided with a head by means of which force may be applied to the cross pin 28 to remove it in the direction from which it was inserted. Sufficient force is applied to shear the locking pin 30, and the cross pin 28 is then removed.

In this manner, the parts may be assembled and separated with access from only one side, which is of great advantage in confined locations. Preferably, recesses such as 36 are provided in both legs of the member 10 to permit these operations to be carried out from either side. Alternatively, a recess could be formed in the pick holder 12.

Although the above embodiment relates to a coal cutting machine, the invention may be used for securing together any pair of parts. Also, if the bores and cross pin are made of circular section, a pivotal connection between the parts may be provided.

We claim:

1. Means for securing together a first, U-shaped member and a second member received within the first member, comprising registering bores in the legs of the first member, a bore in the second member positionable in registration with and of equal cross section to the bores in the first member, at least one recess formed in one of said members to extend transversely from the bore therein, a cross pin having a cross section corresponding with said bores and being of a length equal to or less than the overall length of said bores in registration, the cross pin being hollow and provided on part of its internal surface with a screw thread, the cross pin also having a transverse bore extending from its internal to its external surface and adapted for positioning opposite said recess, and a locking pin in frictional force fit engagement with said transverse bore and seated below the external periphery of said cross pin and drivable along the transverse bore to extend into the recess.

2. Securing means according to claim 1, wherein the bores in the first and second members have a cross section comprising the major part of a circle joined by a straight chord.

3. Securing means according to claim 1, including a keeper member which may be engaged in the screw thread within the cross pin to substantially close the interior of the cross pin.

4. Securing means according to claim 1, wherein the locking pin is a split roll pin which is an interference fit in the transverse bore.

5. Securing means according to claim 1, wherein the first member is provided with two recesses, one in each leg thereof, whereby the cross pin may be inserted from either side.

6. In a mineral mining machine having a driven element carrying U-shaped members for mounting holders for cutting picks, improved securing means between each U-shaped member and the associated holder, comprising:

aligned bores in the legs of the U-shaped member;

a bore in the holder positionable in registration with the bores in the U-shaped member;

said three bores having equal cross section;

at least one recess formed in a leg of the U-shaped member to extend transversely from the bore therein;

a cross pin having a cross section corresponding with said bores and being of a length equal to or less than the overall length of said bores when in registration;

the cross pin being hollow and provided on part of its internal surface with a screw thread, and having a transverse bore extending radially therethrough at a location which is opposite said recess when the cross pin is wholly received within said bores; and a locking pin in frictional force fit engagement with said transverse bore and seated below the external periphery of said cross pin and drivable along the transverse bore to extend into said recess.

* * * * *